UNITED STATES PATENT OFFICE.

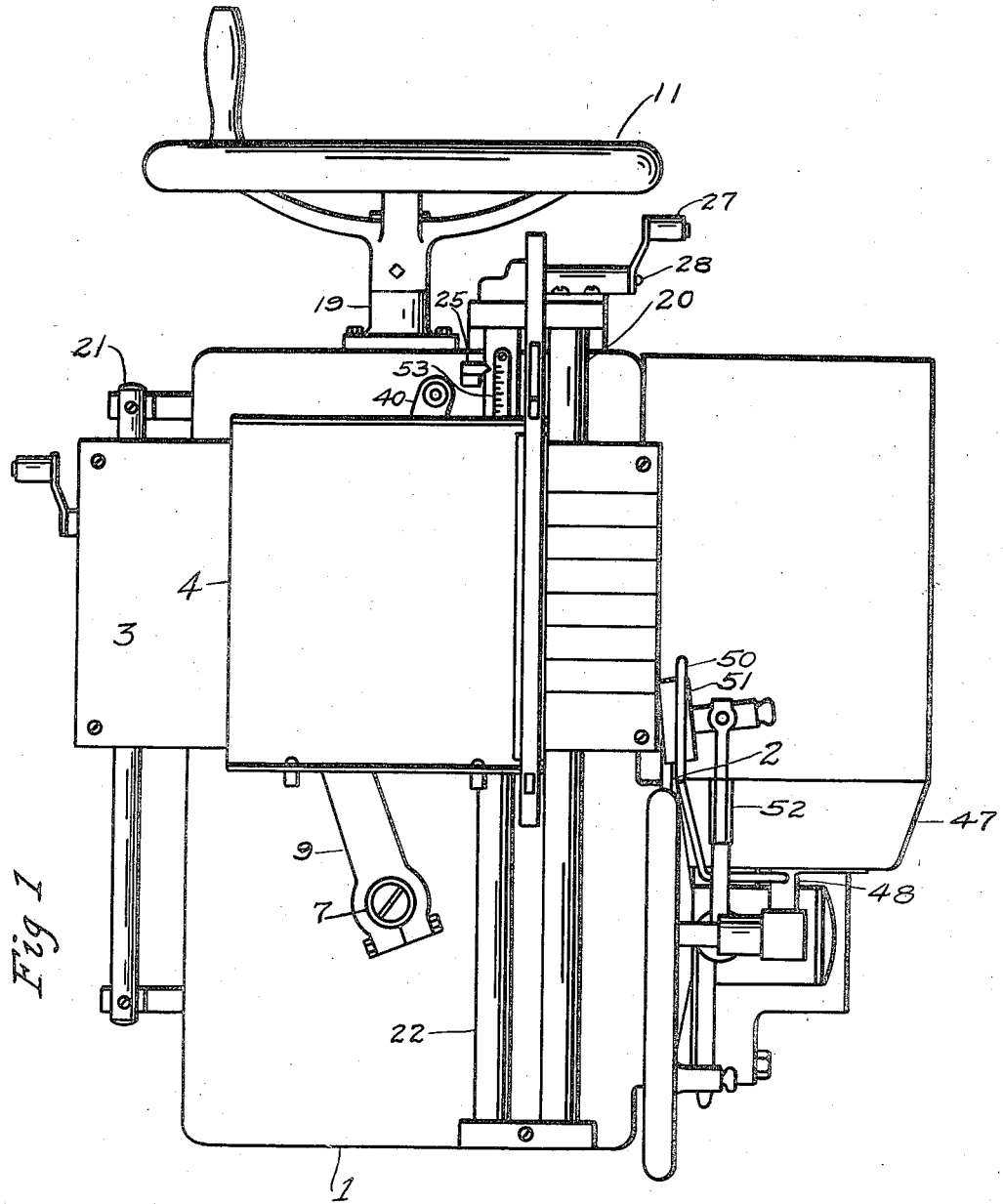

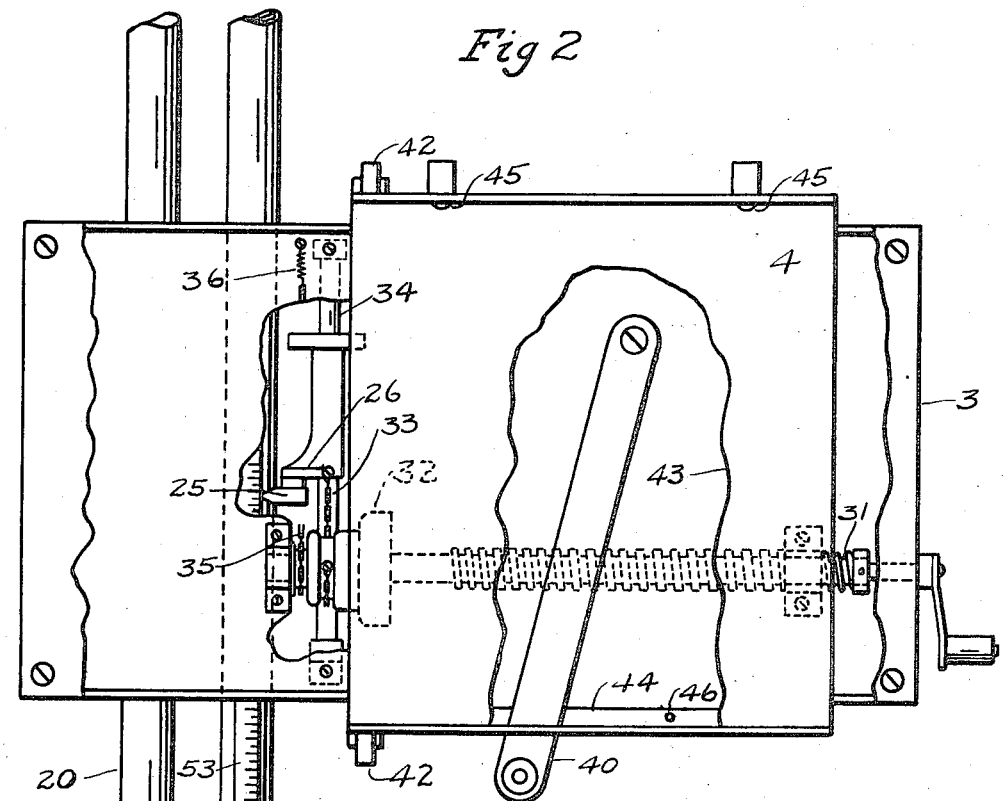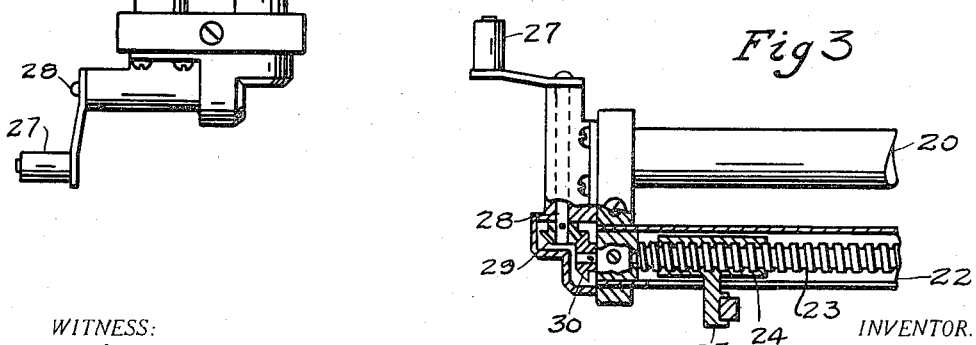

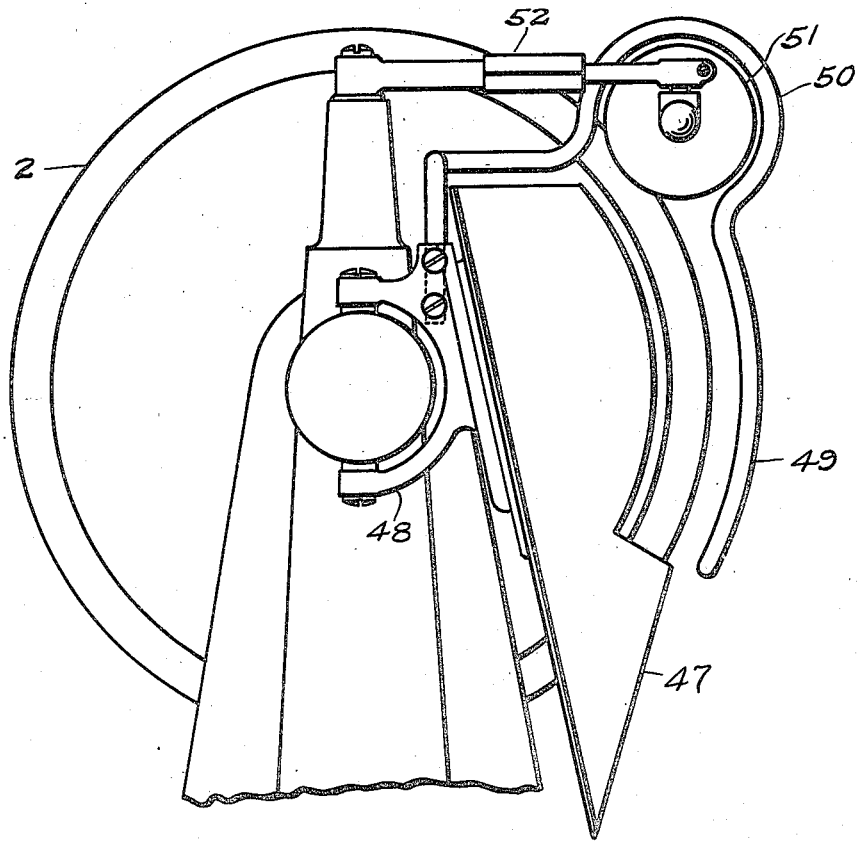

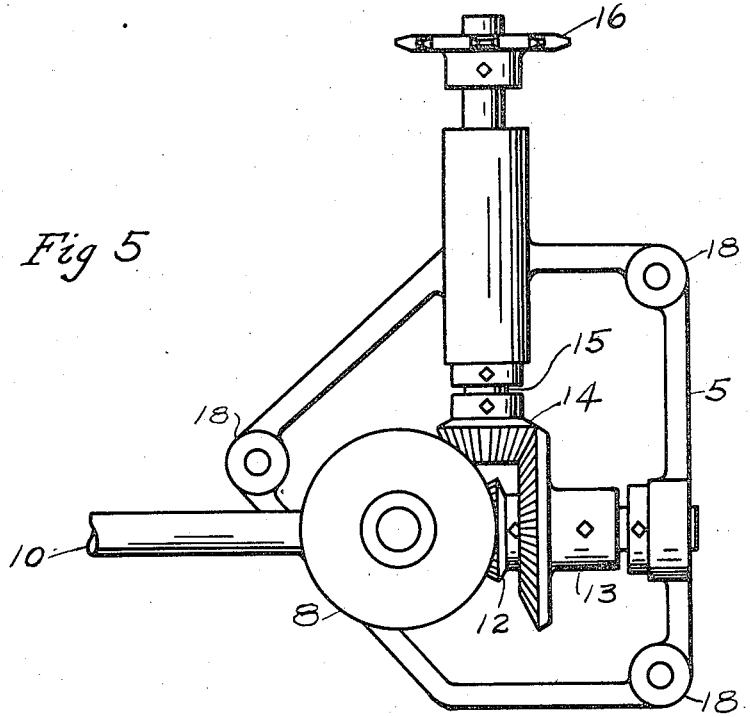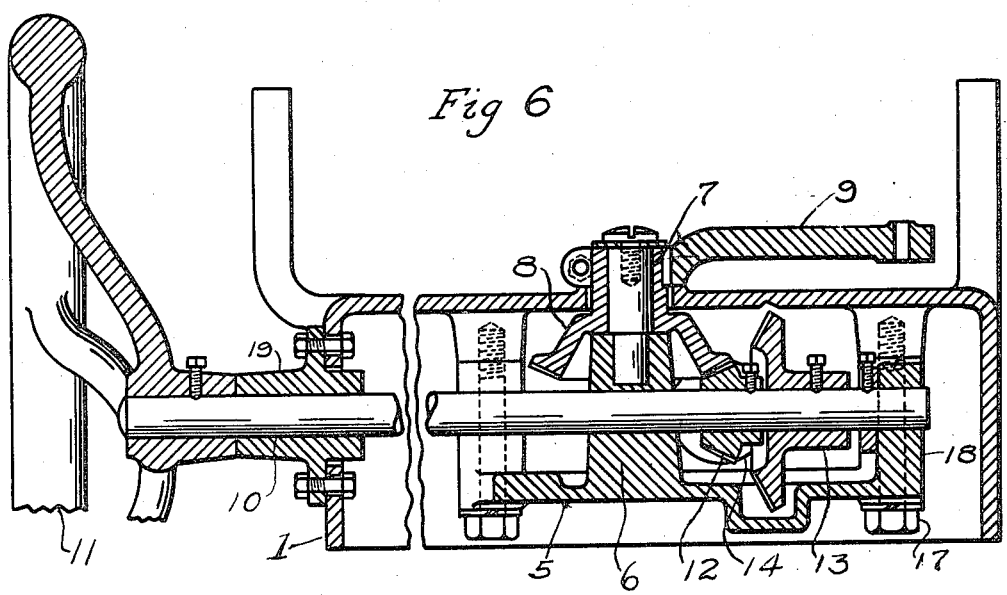

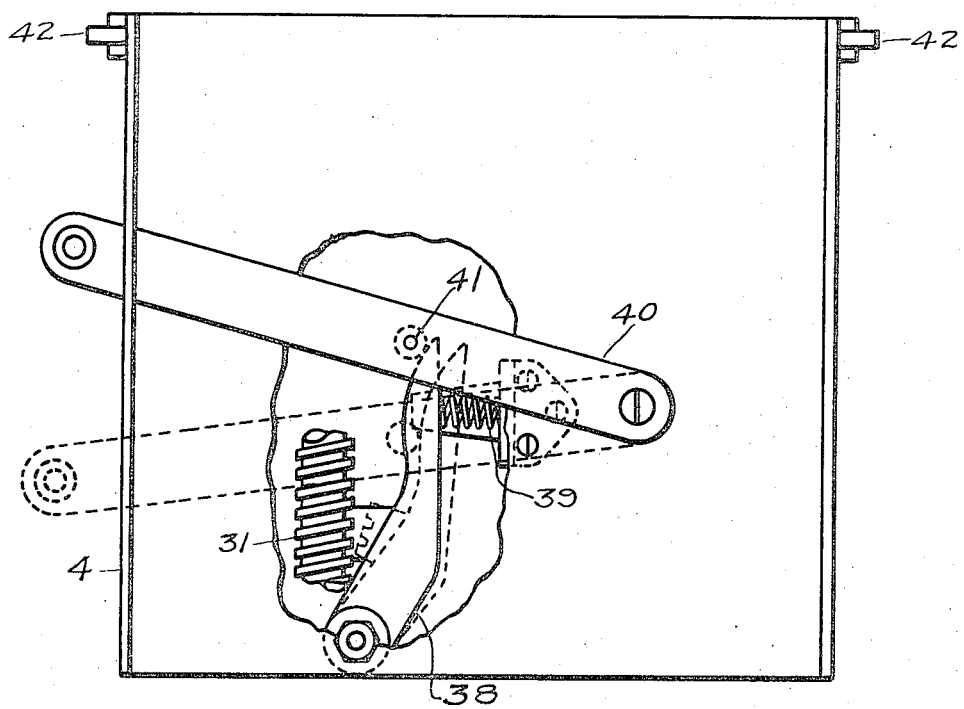
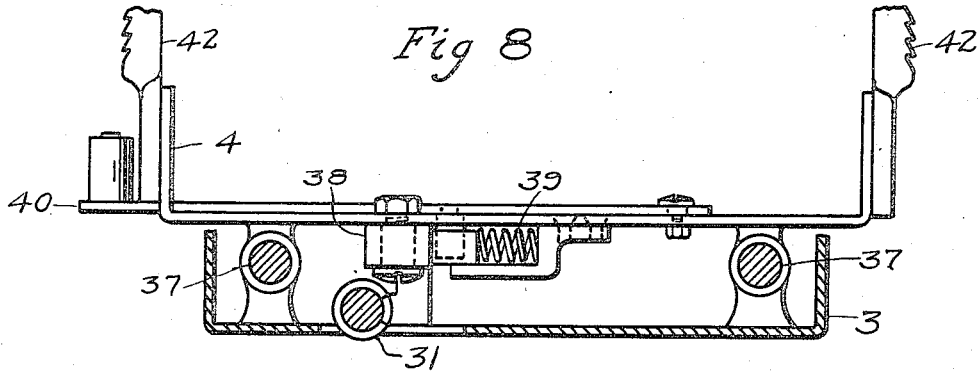

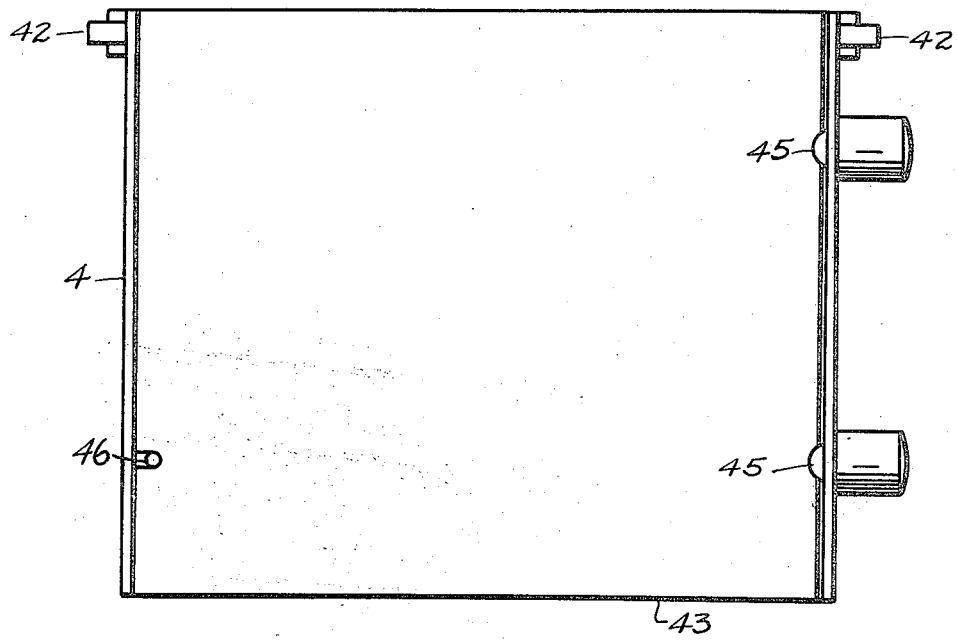
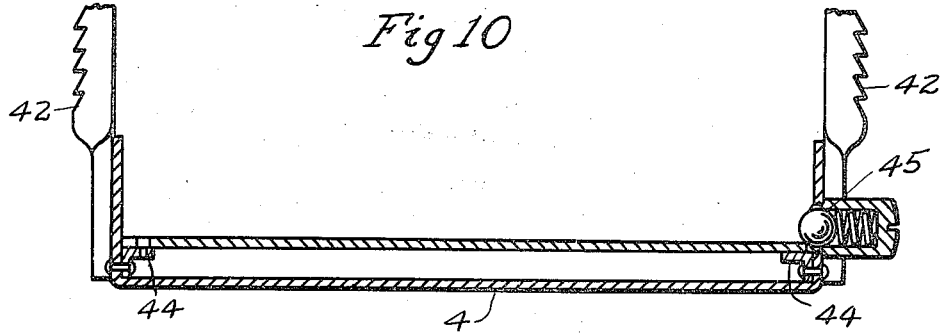

WALLACE B. WOLFF, OF CHICAGO, ILLINOIS, AND ERNEST K. HOOD, OF INDIANAPOLIS, INDIANA, ASSIGNORS TO AMERICAN SLICING MACHINE CO., OF CHICAGO, ILLINOIS, A CORPORATION OF NEW YORK.

SLICING-MACHINE.

1,311,479.     Specification of Letters Patent.     Patented July 29, 1919.

Application filed March 1, 1919. Serial No. 280,005.

*To all whom it may concern:*

Be it known that we, WALLACE B. WOLFF, a resident of Chicago, State of Illinois, and ERNEST K. HOOD, a resident of Indianapolis, State of Indiana, have invented certain new and useful Improvements in Slicing-Machines, of which the following is a specification.

The object of our invention is to provide a slicing machine wherein the reciprocating parts are as light as is consistent with strength and to also provide an easy running and noiseless machine, constructed with as few parts as possible to accomplish the desired results and our invention consists in the combination and arrangement of parts hereinafter described.

In the drawings—

Figure 1 is a plan.

Fig. 2 a plan detail of the feeding mechanism.

Fig. 3 a cross section of a portion thereof.

Fig. 4 an elevation of the meat deflector and finger guard.

Fig. 5 a plan of the gear deck.

Fig. 6 a cross section of the same.

Fig. 7 a plan of the throw out mechanism.

Fig. 8 a cross section of the same.

Fig. 9 a plan of the meat plate and

Fig. 10 a cross section of the same.

Primarily the machine is of the well known type wherein a rotary knife, reciprocating carriage and feeding mechanism is used.

The numeral 1 represents the machine base, 2 the rotary knife, 3 the reciprocating carriage, and 4 the meat plate.

In machines of this type it has been the universal practice to mount gears on bearings forming an integral part of the machine base. We have found that this requires difficult machining operations to produce quiet and accurate running gears. We have therefore provided a gear deck which can be machined and assembled outside of the machine proper and then put into the machine.

This gear deck is provided with a vertical boss 6 carrying a stud 7, which supports a bevel gear 8 adapted to carry the crank 9, which is designed to reciprocate carriage 4. Extending transversely through boss 6, is a main shaft 10, carrying at its outer end a hand power driving wheel 11. A bevel pinion 12 is mounted on shaft 10 and meshes with gear 8. A bevel gear 13 is also mounted on shaft 10, which meshes with a bevel pinion 14 carried by a shaft 15, at right angles to shaft 10. This shaft 14 carries at its outer end a sprocket 16.

The entire gear deck 5, is machined, assembled, and run in and then is secured in base 1 by means of cap screws 17 extending through bosses 18.

We provide 3 of these bosses so as to get a three point suspension and thus prevent any cramping.

The crank arm 9 is removed from the gear deck train when assembled in the machine, and after assembly is made the crank arm is replaced on gear hub 8. The outer end of shaft 10 is supported in an adjustable bearing 19, bolted to the base 1.

This construction enables the replacement of gears without dismantling the machine.

Carriage 3 is reciprocated by a connecting rod attached to crank 9, and the carriage. This carriage slides on two bars 20 and 21.

We mount a tube 22, parallel and adjacent bar 20. This tube carries the feed adjusting mechanism consisting of a screw 23 carrying a nut 24 having a projecting abutment 25.

This projection 25 is in the line of travel of the feed block 26, the operation of which will be hereinafter described.

Screw 23 is operated by means of a crank 27, carried by a shaft 28, having a bevel gear 29, meshing with a bevel gear 30.

By turning crank 27, nut 24 is advanced or retracted so as to arrest the movement of feed block 26, at different points.

The feeding mechanism is primarily like that described in Letters Patent #1224989 issued to us May 8, 1917, the mounting and details however being different.

The main feed screw 31 is attached to the carriage under feeding plate 4.

The feed drum 32 is mounted adjacent feed adjusting screw 23, and is provided with a chain 33 wrapped around drum 32 and connected to feeding block 26, which is adapted to slide on a bar 34 secured to the carriage.

A chain 35, is wrapped around drum 32 in the reverse direction and is connected to a spring 36 fastened to the carriage.

Feeding plate 4 is mounted on rods, 37 supported by carriage 3, and this feeding plate carries on the under side a feed nut 38 normally held in engagement with feed screw 31 by a spring 39.

The feed nut is thrown out of engagement with the feed screw by means of a lever 40 provided with a pin 41 engaging a cam surface of the end of feed nut 38.

The feeding plate is provided with racks 42 which carry the usual clamping bar for holding the meat.

The meat supporting plate consists of a flat piece 43 carried by angles or supports 44 secured to the feeding plate. This plate is held in position by means of plunger balls 45 as shown.

A pin 46 engaging a slot in plate 43 prevents forward movement of the plate with respect to the feeding plate.

In operation the meat plate edge is dropped down adjacent plunger balls 45, and the plate is then faced down and into position. It is easily lifted out and this is very important from a sanitary point.

The meat is gripped between the meat plate and the cross bar carried by the racks 42, supported by the feeding plate. This is important as it insures solid clamping of the meat with respect to the feeding plate thus insuring uniform slicing.

In order to properly deflect the slice as it is cut, we mount a deflector, 47, on a yoke 48, pivoted radially with respect to the knife shaft.

This yoke also carries a forward knife guard 49 arched at 50, to allow the use of the usual sharpener stone 51 which is carried by an arm 52, also pivoted radially with respect to the knife shaft.

This construction makes it possible to swing the deflector entirely away from the knife and around the knife shaft bearing. This is important as it allows perfect cleaning of the knife.

The operation is as follows: Meat is clamped in feeding plate 4. The feed adjusting nut 24, is set to the desired thickness shown on index 53. Power wheel is rotated, thus causing knife 2 to rotate and carriage 3 to reciprocate.

When the carriage comes forward feed block 26 strikes feed adjusting nut abutment 25, the carriage, continues its forward movement to its limit, but on account of arresting the movement of feed block 26, the drum 32 is rotated, thus rotating the screw 31 and forcing feeding plate 4 forward. When the carriage starts on the return or cutting stroke, the spring 36 returns drum 32 to its initial position.

The adjusting nut 24 can be moved an infinitesimal amount thus enabling the cutting of any thickness of slice from nothing to the limit of the machine.

We claim as our invention:—

1. In a slicing machine the combination of a base; a reciprocating carriage; a gear train adapted to actuate said knife and carriage; and a removable gear deck carrying said gear train without disassembling the same when said deck is removed substantially as and for the purpose set forth.

2. In a slicing machine the combination of a base; a reciprocating carriage; a gear train adapted to actuate said knife and carriage; a deflector; mounted radially on the knife housing and adapted to swing around the end of said housing substantially as and for the purpose set forth.

3. In a slicing machine the combination of a base; a reciprocating carriage; guide rods supporting said carriage; a feed adjusting tube between said guide rods; a screw mounted in said tube; an adjustable nut on said screw provided with an abutment; a feed mechanism carried by said carriage; said feed mechanism adapted to be actuated by contact with the abutment substantially as and for the purpose set forth.

4. In a slicing machine a reciprocating carriage; a feeding plate; transversely adjustable on said carriage; a removable plate carried by said feeding plate; and clamping means; secured to the feeding plate and adapted to grip material on the removable plate substantially as and for the purpose set forth.

5. In a slicing machine; a reciprocating carriage; guide rods supporting said carriage; a feed adjusting slotted tube between said guide rods; a screw mounted in said tube; an adjustable nut on said screw provided with an abutment projecting through said slot and a bar securely mounted to carriage supporting a slidable member and means for intermittently moving the slidable member on said bar substantially as and for the purpose set forth.

6. In a slicing machine; a reciprocating carriage; a centrally disposed feed screw mounted therein; a ball clutch mounted on the feed screw and means for intermittently rotating said feed screw, said means located under the carriage and adjacent the reciprocating means for the carriage substantially as and for the purpose set forth.

7. In a slicing machine; a reciprocating carriage; a slidable member mounted under said carriage and means for intermittently arresting the movement of this slidable member in respect to the said carriage substantially as and for the purpose set forth.

8. The combination with a meat slicing machine of the class described; of a guard for the effective cutting portion of the knife; said guard being mounted radially, with respect to the knife arbor and adapted to swing around the end of the same, substantially as and for the purpose set forth.

WALLACE B. WOLFF.
ERNEST K. HOOD.

Witnesses:
 BESS WIARS,
 M. H. FULLER.